United States Patent [19]

Nagane et al.

[11] Patent Number: 5,844,687
[45] Date of Patent: *Dec. 1, 1998

[54] IMAGE PROCESSING APPARATUS

[75] Inventors: Hiromichi Nagane, Yokohama; Akio Okubo, Tokyo; Masakatsu Yamada, Kawasaki; Yasuhiko Ikeda, Sagamihara, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 579,732

[22] Filed: Dec. 28, 1995

[30] Foreign Application Priority Data

| Dec. 28, 1994 | [JP] | Japan | 6-328324 |
| Dec. 28, 1994 | [JP] | Japan | 6-328325 |
| Dec. 28, 1994 | [JP] | Japan | 6-329106 |
| Dec. 28, 1994 | [JP] | Japan | 6-329107 |

[51] Int. Cl.⁶ .............................. H02N 1/32; G03G 15/00
[52] U.S. Cl. .................... 358/296; 358/442; 358/468; 399/107; 399/110
[58] Field of Search .................... 358/296, 400, 358/401, 442–444, 468; 395/107, 114; 346/145; 347/222, 245, 263, 108, 107, 138, 152; 399/1, 107, 110, 893

[56] References Cited

U.S. PATENT DOCUMENTS

| 4,920,384 | 4/1990 | Okamoto | 355/311 |
| 5,188,351 | 2/1993 | Gysling | 271/171 |
| 5,216,158 | 6/1993 | Killian et al. | 271/207 |
| 5,383,012 | 1/1995 | Yamada | 355/326 |
| 5,454,553 | 10/1995 | Firl et al. | 271/4.04 |
| 5,506,657 | 4/1996 | Ito et al. | 355/202 |
| 5,510,896 | 4/1996 | Wafler | 358/296 |
| 5,532,825 | 7/1996 | Lim et al. | 358/296 |
| 5,573,236 | 11/1996 | Petocchi et al. | 271/265.02 |

FOREIGN PATENT DOCUMENTS

| 0495433 A2 | 7/1992 | European Pat. Off. | 358/296 |
| 0602667 | 6/1994 | European Pat. Off. | |
| 6-326841 | 11/1994 | Japan | 358/296 |
| 7-306730 | 11/1995 | Japan | 358/296 |
| 2238758 | 6/1991 | United Kingdom | |
| 2276510 | 9/1994 | United Kingdom | |

*Primary Examiner*—Peter S. Wong
*Assistant Examiner*—Gregory J. Toatley, Jr.
*Attorney, Agent, or Firm*—Fitzpatrick, Cella, Harper & Scinto

[57] ABSTRACT

In an image processing apparatus, in order to integrate a recording device for obtaining a hard copy and an image reading device for reading a desired image, the image reading device is disposed above the recording device, and the apparatus has a housing for housing a first control circuit unit for the recording unit and a second control circuit unit for the image reading device, a storage unit for temporarily storing an image processed between the apparatus and the host computer side and an image to be output to the recording device, and a power supply unit, so as to minimize the area required for the apparatus. The apparatus takes a countermeasure against noise. The apparatus can be connected to the host computer via only one Bicentronics-standard interface cable, and can obtain hard copies of different sizes.

50 Claims, 11 Drawing Sheets

IMAGE PROCESSING APPARATUS

BACKGROUND OF THE INVENTION

The present invention relates to an image processing apparatus and, more particularly, to an image processing apparatus which is constituted by integrating a recording device (to be referred to as a printer hereinafter) complying with a Bicentronics interface standard, and an image reading device (to be referred to as a scanner hereinafter).

SUMMARY OF THE INVENTION

The Institute of Electrical and Electronics Engineers (IEEE) recommended a Bicentronics standard as a new interface standard that can replace a parallel I/O interface standard, which has been popularly used as an interface (cable) for so-called peripheral devices such as a printer, scanner, and the like connected to, e.g., a personal computer.

The new standard has a basic conception in that bidirectional data exchange is attained between a host computer and peripheral devices instead of the conventional conception in that data is output from the host side using signal lines such as GND, Vcc, strobe, acknowledge, busy lines, and the like, and an 8-bit (1-byte) data signal line. The new standard is a promising one since it is an interface standard which can maximally exhibit its advantage, e.g., can effectively utilize recent processors that have increasingly improved their processing power.

On the other hand, in various types of industries, for example, a color original image is read using a scanner, and the scanned image is temporarily stored in an image memory unit to obtain a soft copy on a computer display. Thereafter, the soft copy is subjected to desired image processing, and the processed copy is output to a color printer, thereby obtaining a desired color hard copy.

For example, textile/apparel industries, interior design industries, and various other design industries of such types of industries require arbitrary color reproduction, very strict color reproduction performance, and many color hard copies within a short period of time. For this reason, according to a full-scale image processing apparatus used in such types of industries, for example, an image processing unit which color-separates R, G, and B signals read by a color image scanner into Y, M, C, and B color signals is constituted by a hardware arrangement to attain high-speed processing. As a result, the hardware arrangement becomes very complicated and expensive, and such an apparatus is not suitable for general users who want a color hard copy for their personal use.

It is known that general users who want a color hard copy for their personal use, and have already purchased personal computers can constitute a simple image processing apparatus by connecting a color or monochrome image scanner and a color or monochrome printer to the personal computer. Some users actually utilize such apparatuses.

However, in order to constitute the above-mentioned simple image processing apparatus, a parallel I/O interface cable which is compatible with the Centronics standard or complies with the SCSI standard, or an RS232C serial cable must be connected between a host computer and a scanner or printer, resulting in tedious cable connection. In addition, the cables disturb setting of the respective devices on the desk. Also, the cost of special-purpose cables is high.

Furthermore, in order to constitute the simple image processing apparatus, a general user normally sets a mouse, a keyboard, and the like on the desk in addition to the host computer, scanner, printer, and the like. In particular, the host computer and the scanner require large setting spaces since a sheet path for at least A4-size recording sheets and original sheets must be assured, and they can no longer set on a single desk. In order to set all these devices on a single desk, a setting rack having some shelves is required.

As a result, when, for example, the scanner and printer are set on the setting rack, a user must stand up or stoop down each time he or she sets original and recording sheets, resulting in worst operability. In addition, when the scanner and the printer are simply juxtaposed, an unexpected operation error may occur due to the influence of noise between the scanner and printer.

On the other hand, original and recording sheets having different vertical and horizontal sizes are often used. In this case, when an A5-size original sheet set on the scanner in a vertically elongated state is read, and thereafter, the read image is recorded on an A5-size recording sheet, the indispensable condition is to set the original and recording sheets to have an accurate relative positional relationship therebetween. In particular, in the simple apparatus, when a read image is directly output in a one-to-one correspondence with the printer without performing any processing for the read image, the absolute condition is to accurately adjust the relative positional relationship between the original and recording sheets and to prevent these sheets from being set with wrong sides facing up.

When, e.g., an ink-jet printer is used as the recording device, an ink cartridge must be appropriately exchanged. Since ink in the ink cartridge is consumed by recording operations, various kinds of alarm means are provided to the printer side so as to inform a user of the use-up state of the ink. Nonetheless, ink is often used up during a print operation. When the cartridge is exchanged at that time, a user discards the sheet in the print operation, and restarts the print operation from the beginning. Alternatively, after the carriage of the printer is moved to the standby position, the exchange cover of the printer is opened, a new cartridge is set, and thereafter, the print operation is restarted.

An auxiliary ink cartridge may be lost and cannot be found or may be out of stock unless a user keeps a new one in a predetermined place. As a result, the print operation cannot often be restarted.

Therefore, the present invention has been made in consideration of the above-mentioned problems, and has as its object to provide an image processing apparatus which uses a Bicentronics-standard interface cable to prevent cables from being complicated, can minimize the area required for a scanner and a printer, has high noise resistance, and can obtain a desired hard copy by setting original and recording sheets to have an accurate relative positional relationship therebetween.

It is another object of the present invention to provide an image processing apparatus which allows a user to handle original and recording sheets from the front side of the apparatus with good operability, and can obtain a desired hard copy by setting original and recording sheets to have an accurate relative positional relationship therebetween.

It is still another object of the present invention to provide an image processing apparatus which can constitute a simple copying machine that can minimize the area required for a scanner and a printer and has good operability, and which can obtain a desired hard copy by setting original and recording sheets to have an accurate relative positional relationship therebetween.

It is still another object of the present invention to provide an image processing apparatus which uses a Bicentronics-standard interface cable to prevent cables from being complicated, can minimize the area required for a scanner and a printer, and has high noise resistance and good operability.

It is still another object of the present invention to provide an image processing apparatus which can obtain a desired hard copy by setting original and recording sheets to have an accurate relative positional relationship therebetween.

It is still another object of the present invention to provide an image processing apparatus which uses a Bicentronics-standard interface cable to prevent cables from being complicated, can minimize the area required for a scanner and a printer, has high noise resistance, allows a user to handle original and recording sheets from the front side of the apparatus with good operability, and can obtain a desired hard copy by setting original and recording sheets to have an accurate relative positional relationship therebetween.

It is still another object of the present invention to provide an image processing apparatus which uses a Bicentronics-standard interface cable to prevent cables from being complicated, can minimize the area required for a scanner and a printer, has high noise resistance, can restart a recording operation any time by storing an auxiliary recording medium in the apparatus, and can obtain a desired hard copy.

In order to achieve the above objects, according to the present invention, an image processing apparatus, which integrates a recording device which has a recording sheet supply unit with a sheet size adjustment function that allows recording sheets of different sizes to be placed so as to obtain a hard copy, and an image reading device which has an original reading unit for reading an image surface of an original sheet after aligning a leading end portion of the original sheet so as to read original sheets of different sizes, preferably comprises a housing which houses a first control circuit unit for the recording device and a second control circuit unit for the image reading device, a storage unit for temporarily storing an image processed between the apparatus and a host computer side and an image to be output to the recording device, and a power supply unit, and has a structure for disposing the image reading device above the recording device, and a Bicentronics-standard interface cable connected to the storage unit and the host computer side.

An image processing apparatus, which integrates a recording device which allows a user to handle a recording sheet from the front side and has a recording sheet supply unit with a sheet size adjustment function that allows recording sheets of different sizes to be placed so as to obtain a hard copy, and an image reading device which allows the user to handle an original sheet from the front side to read a desired image, and has an original reading unit for reading an image surface of an original sheet after aligning a leading end portion of the original sheet so as to read original sheets of different sizes, preferably comprises a housing which houses a first control circuit unit for the recording device and a second control circuit unit for the image reading device, a storage unit for temporarily storing an image processed between the apparatus and a host computer side and an image to be output to the recording device, and a power supply unit, and has a structure for disposing the image reading device above the recording device, and a Bicentronics-standard interface cable connected to the storage unit and the host computer side.

An image processing apparatus, which integrates a recording device which allows a user to handle a recording sheet from the front side and has a recording sheet supply unit with a sheet size adjustment function that allows recording sheets of different sizes to be placed so as to obtain a hard copy, and an image reading device which allows the user to handle an original sheet from the front side to read a desired image, and has an original reading unit for reading an image surface of an original sheet after aligning a leading end portion of the original sheet so as to read original sheets of different sizes, preferably comprises a housing which houses a first control circuit unit for the recording device and a second control circuit unit for the image reading device, a storage unit for temporarily storing an image to be output to the recording device, and a power supply unit, and has a structure for disposing the image reading device above the recording device, a Bicentronics-standard interface cable connected to the storage unit and the recording device, and an operation unit for performing a copying operation.

An image processing apparatus which integrates a recording device for obtaining a hard copy, and an image reading device for reading a desired image, preferably comprises a housing which houses a first control circuit unit for the recording device and a second control circuit unit for the image reading device, a storage unit for temporarily storing an image processed between the apparatus and a host computer side and an image to be output to the recording device, and a power supply unit, disposes the image reading device above the recording device, and has an operation panel unit disposed adjacent to a side surface portion of the image reading device, and a Bicentronics-standard interface cable connected to the storage unit and the host computer side.

An image processing apparatus preferably comprises a housing for defining an outer appearance of the image processing apparatus, a recording device which has a recording unit and a recording sheet feed path for feeding a recording sheet to the recording unit, and is arranged in a lower portion of the housing, a reading device which has a reading unit and an original sheet placing table for reading an original sheet by the reading unit, is coupled to the recording unit at rear portions thereof, and is arranged in an upper portion of the housing so that the housing has a hierarchical structure, an operation unit which is arranged on a side portion of the housing to couple the reading device and the recording device, and a control circuit board which mounts a first control circuit unit for the recording device and a second control circuit unit for the reading device, is connected to an external host computer via an interface cable, and is arranged in a rear portion of the housing.

An image processing apparatus preferably comprises a recording device, a reading device arranged above the recording device, a housing which couples the recording device and the reading device at rear portions thereof to form a hierarchical structure, and defines an outer appearance of the image processing apparatus, an operation unit which couples the reading device and the recording device, and is arranged on a side portion of the housing, and a control circuit board which mounts a first control circuit unit for the recording device and a second control circuit unit for the reading device, is connected to an external device via an interface cable, and is arranged in a rear portion of the housing.

An image processing apparatus preferably comprises a housing for defining an outer appearance of the image processing apparatus, a recording device which has a recording sheet supply unit with a sheet size adjustment function that allows recording sheets of different sizes to be placed so as to obtain a hard copy, and is arranged in a lower portion of the housing, an image reading device which is coupled to the recording device at rear portions thereof to form the housing in a hierarchical structure, has an original reading unit for reading an image surface of an original sheet after aligning a leading end portion of the original sheet so as to read original sheets of different sizes, and is arranged in the housing above the recording unit, an operation unit which is arranged on a side portion of the housing to couple the reading device and the recording device, and a control circuit board which mounts a first control circuit unit for the recording device and a second control circuit unit for the reading device, is connected to an external device, via an interface cable, and is arranged in a rear portion of the housing.

An image processing apparatus which integrates a recording device using an exchangeable recording medium to obtain a hard copy, and an image reading device for reading a desired image, preferably comprises a housing which houses a first control circuit unit for the recording device and a second control circuit unit for the image reading device, a storage unit for temporarily storing an image processed between the apparatus and a host computer side and an image to be output to the recording device, and a power supply unit, disposes the image reading device above the recording device, and has a lid portion disposed adjacent to a side surface portion of the image reading device, and a recording medium storage portion from which the recording medium is detachable in an open state of the lid portion, and a Bicentronics-standard interface cable connected to the storage unit and the host computer side.

With the above arrangement, in order to integrate the recording device for obtaining a hard copy and the image reading device for reading a desired image, the image reading device is disposed above the recording device, and the area required for the apparatus is minimized by the housing which houses the first control circuit unit for the recording device, the second control circuit unit for the image reading device, the storage unit for temporarily storing an image processed between the image processing apparatus and the host computer side and an image to be output to the recording device, and the power supply unit. In addition, a countermeasure against noise is taken, and the image processing apparatus can be connected to the host computer side by only one Bicentronics-standard interface cable. Furthermore, hard copies of different sizes can be obtained.

In order to integrate the recording device for obtaining a hard copy and the image reading device for reading a desired image so as to allow a user to operate these devices from the front side of the apparatus, the image reading device is disposed above the recording device, and the area required for the apparatus is minimized by the housing which houses the first control circuit unit for the recording device, the second control circuit unit for the image reading device, the storage unit for temporarily storing an image processed between the image processing apparatus and the host computer side and an image to be output to the recording device, and the power supply unit. In addition, a countermeasure against noise is taken, and the image processing apparatus can be connected to the host computer side by only one Bicentronics-standard interface cable. Furthermore, operability associated with handling of sheets can be improved.

In order to constitute the copying machine by integrating the recording device for obtaining a hard copy and the image reading device for reading a desired image, the image reading device is disposed above the recording device, and the area required for the apparatus is minimized by the housing which houses the first control circuit unit for the recording device, the second control circuit unit for the image reading device, the storage unit for temporarily storing an image to be output to the recording device, and the power supply unit. In addition, a countermeasure against noise is taken, and a simple copying machine can be constituted.

In order to integrate the recording device for obtaining a hard copy and the image reading device for reading a desired image, the image reading device is disposed above the recording device, and the area required for the apparatus is minimized by the housing which houses the first control circuit unit for the recording device, the second control circuit unit for the image reading device, the storage unit for temporarily storing an image processed between the image processing apparatus and the host computer side and an image to be output to the recording device, and the power supply unit. In addition, a countermeasure against noise is taken, and an easy access to an operation panel and an easy exchange operation of the recording medium are allowed. Furthermore, the image processing apparatus can be connected to the host computer side by only one Bicentronics-standard interface cable.

In order to integrate the recording device for obtaining a hard copy and the image reading device for reading a desired image so as to allow a user to operate these devices from the front side of the apparatus, the image reading device is disposed above the recording device, and the area required for the apparatus is minimized by the housing which houses the first control circuit unit for the recording device, the second control circuit unit for the image reading device, the storage unit for temporarily storing an image processed between the image processing apparatus and the host computer side and an image to be output to the recording device, and the power supply unit. In addition, a countermeasure against noise is taken, and the image processing apparatus can be connected to the host computer side by only one Bicentronics-standard interface cable. Furthermore, operability associated with handling of sheets can be improved, and hard copies of different sizes can be obtained.

In order to constitute the copying machine by integrating the recording device for obtaining a hard copy and the image reading device for reading a desired image, the image reading device is disposed above the recording device, and the area required for the apparatus is minimized by the housing which houses the first control circuit unit for the recording device, the second control circuit unit for the image reading device, the storage unit for temporarily storing an image to be output to the recording device, and the power supply unit. In addition, a countermeasure against noise is taken, and a simple copying machine that can obtain hard copies of different sizes can be constituted.

In order to integrate the recording device for obtaining a hard copy and the image reading device for reading a desired image so as to allow a user to operate these devices from the front side of the apparatus, the image reading device is disposed above the recording device, and the area required for the apparatus is minimized by the housing which houses the first control circuit unit for the recording device, the second control circuit unit for the image reading device, the storage unit for temporarily storing an image processed between the image processing apparatus and the host computer side and an image to be output to the recording device, and the power supply unit. In addition, a countermeasure against noise is taken, and the image processing apparatus can be connected to the host computer side by only one Bicentronics-standard interface cable. Furthermore, an auxiliary recording medium is stored in the apparatus, so that the recording operation can be restarted any time to obtain a desired hard copy.

Note that the present invention includes various arrangements that can be practiced within the range defined by the scope of appended claims, and is not limited to the embodiments to be described below and the arrangements illustrated on the accompanying drawings.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

The preferred embodiments of the present invention will be described in detail hereinafter with reference to the accompanying drawings.

Figure 1:
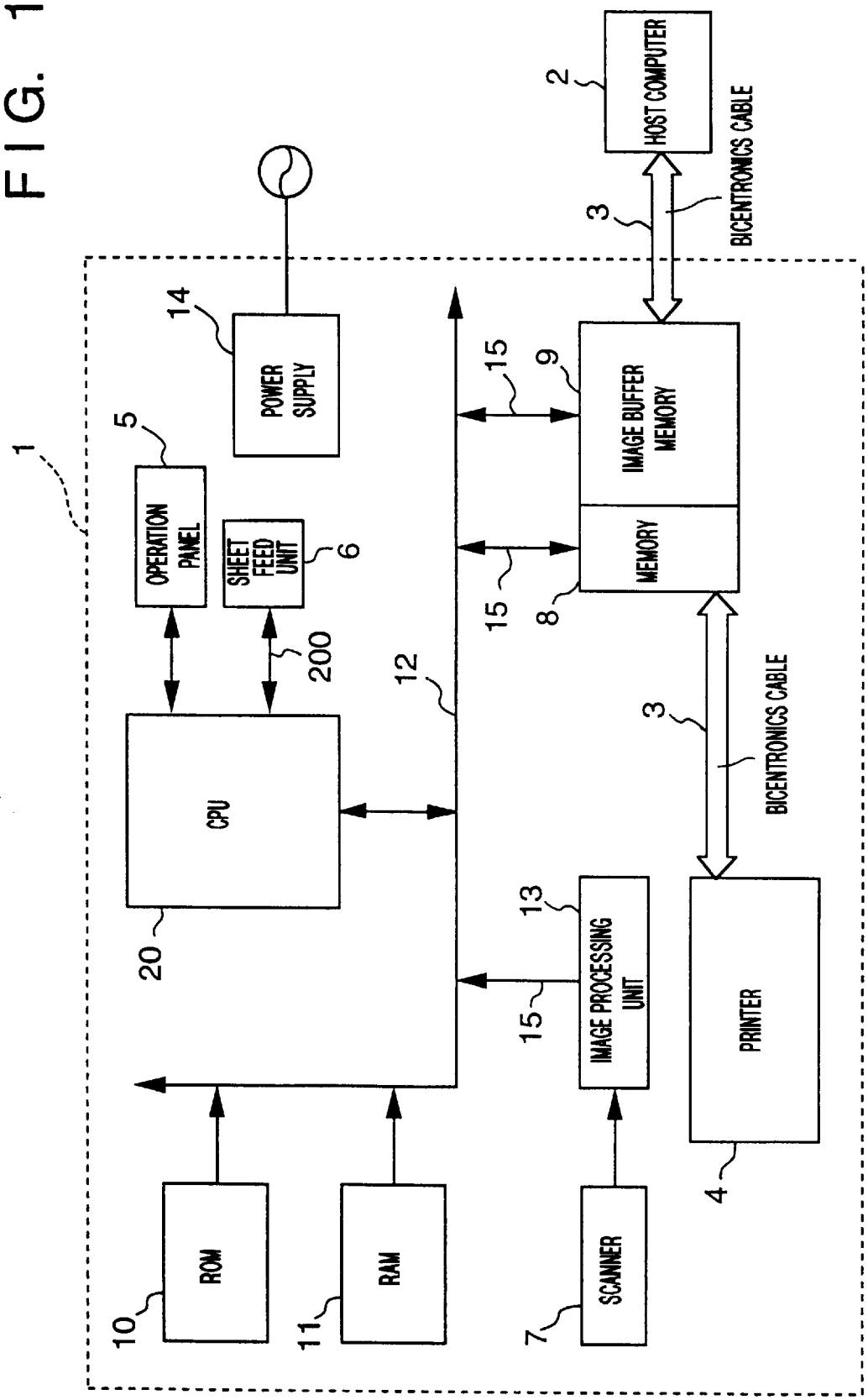
FIG. 1 is a block diagram common to the respective embodiments of the present invention.

FIG. 1 is a block diagram common to the respective embodiments of the present invention. In an image processing apparatus 1 indicated by a broken line in FIG. 1, a printer 4 for obtaining a hard copy, and a scanner 7 which reads a desired image and is constituted by a CCD and a read image processing unit 13 are connected to a CPU bus line 12 via direct memory access lines 15.

Furthermore, a first control circuit unit (not shown) for the printer 4 is constituted by a CPU, a ROM, a RAM, and a gate array, a printer buffer memory 8 connected to the first control circuit unit via an internal Bicentronics cable 3, and an image buffer memory 9 connected to a personal computer 2 via a single external Bicentronics cable 3 are connected to the CPU bus line 12 via the direct memory access lines 15.

On the other hand, a CPU 20 for controlling the entire apparatus, a ROM 10, and a RAM 11 are connected to the CPU bus line 12. Also, an operation panel 5 and an automatic sheet feed unit 6 are detachably connected to the CPU 20 via connectors 200. Also, a power supply unit 14 is similarly housed.

With the above-mentioned arrangement, a driving control circuit unit for the printer 4 and a driving control circuit unit for the scanner 7 constituted by the CCD of an image reader and the read image processing unit 13 can be mounted on, e.g., a single board. As a result, a common ground can be assured on a single board, thus greatly improving noise resistance. Since the apparatus can be connected to the personal computer 2 via the single Bicentronics cable, a physical installation can be very simply attained.

Figure 2:
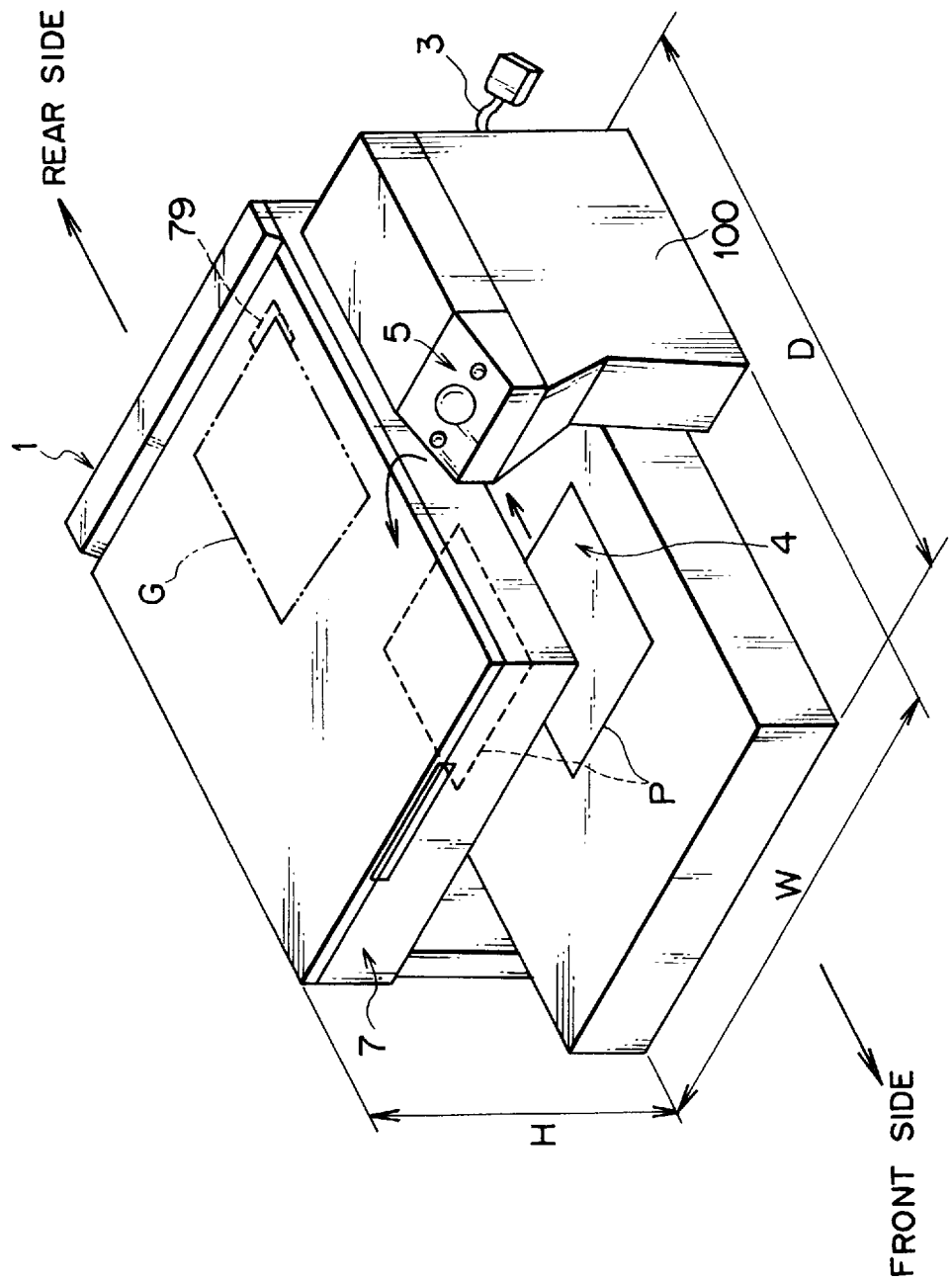
FIG. 2 is a perspective view showing the outer appearance of an apparatus 1.

FIG. 2 is a perspective view showing the outer appearance of a housing 100 having a structure for disposing the scanner 7 above the printer 4, and the operation panel 5.

Referring to FIG. 2, the Bicentronics-standard interface cable 3 connected to the personal computer 2 serving as a host computer extends from the rear side of the housing 100 to an external portion. Since the scanner 7 is disposed above the printer 4 to realize a two-layered structure, the area of the overall apparatus 1 is almost determined by only that of the printer 4, thus minimizing the area required for the apparatus.

For example, when an A4-size original sheet G and an A4-size recording sheet P are to be handled, the width, W, the depth, D, and the height, H, of the apparatus can be respectively set to be about 410 mm, 400 mm, and 230 mm. As a result, the area required for the apparatus is 1,640 cm$^2$ at maximum, and the apparatus 1 can be used adjacent to the personal computer 2 on a standard-size desk. It is found as a result of manufacturing the apparatus of this embodiment on a trial basis that the operability can be greatly improved since all the operations can be performed from the front side of the apparatus, as shown in FIG. 2.

In FIG. 2, an alignment mark 79 indicated by a broken line is formed on a rear-side portion on the original placing surface of the scanner 7. The alignment mark serves as a reference upon setting the original sheet G with its image surface facing down. When the original sheet is set while the upper right corner portion of the original sheet matches this mark, a small-size original sheet having a size other than a standard size (e.g., A4 size), and an original sheet which has a size larger than the standard size and cannot be placed on the original placing surface can be aligned.

In the printer 4, since a recording sheet having the same size as that of the original sheet G is set in such a manner that the right side surface of the recording sheet P abuts against the inner side of a sheet guide portion (not shown) using an adjustment plate 21 (to be described later), and the leading end portion of the recording sheet P abuts against the rear-side portion, the recording sheet P is reversed, as indicated by an arrow in FIG. 2, after it is subjected to a recording operation. With this structure, the positional relationship between the original and recording sheet can be easily determined, resulting in a very convenient apparatus. In addition, since the original and recording sheets are set to face the same direction and to have the same positional relationship therebetween in the upper, lower, right, left, back, and forth directions, an operation error, e.g., a print operation after these sheets are set with wrong sides facing up or in a vertically reverse state, can be prevented. On the other hand, even when the sheet is not reversed unlike in FIG. 2, the sheets can be set in substantially the same manner as described above.

Figure 3:
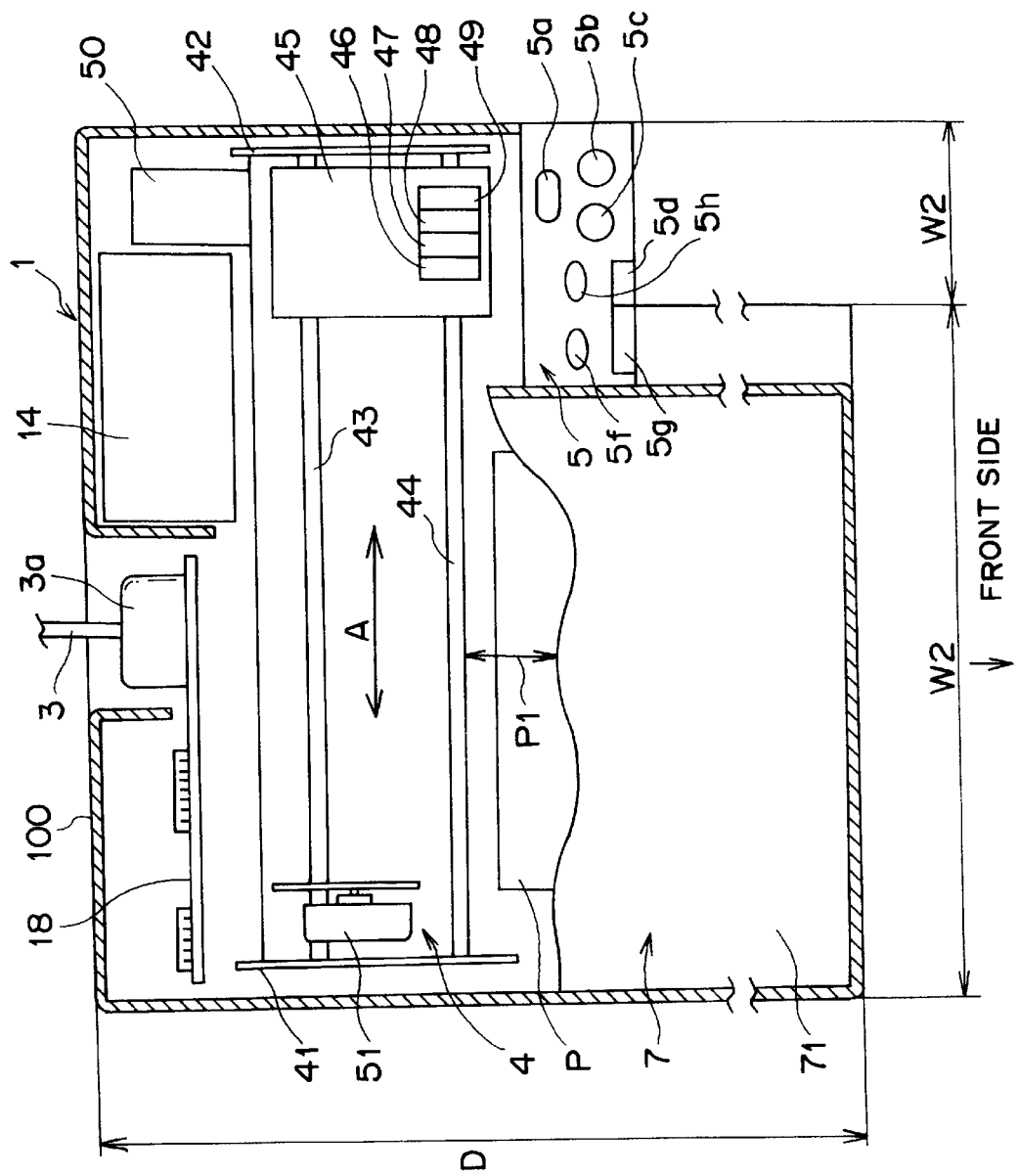
FIG. 3 is a partially sectional plan view showing principal part of the apparatus 1.

FIG. 3 is a partially cutaway plan view showing principal part of the apparatus 1 shown in FIG. 2. In FIG. 3, the printer 4 is constituted by a serial recording type color ink-jet printer proposed by the present applicant. Note that the type of the printer 4 is not particularly limited. For example, when a monochrome copy is to be obtained, the printer 4 may be constituted by a thermal line head which is fixed in a direction perpendicular to a thermal sheet as the recording sheet P fed in the direction of an arrow P1 in FIG. 3, thus realizing a very low-cost arrangement. On the other hand, a color printer may be constituted by fixing three thermal line heads, and looping yellow, magenta, and cyan color ink ribbons on the respective heads.

Referring to FIG. 3, in the rear portion of the housing 100, a board 18 on which the read image processing unit 13, the CPU bus line 12, the direct memory access lines 15, the first control circuit unit for the printer 4, which unit is constituted by the CPU, ROM, RAM, gate array, and the like, the printer buffer memory 8 connected via the internal Bicentronics cable 3, the image buffer memory 9 connected to the personal computer 2 via the single external Bicentronics cable 3, the CPU 20 for controlling the entire apparatus, and the like, are disposed in an upright state, as shown in FIG. 3. On the other hand, a connector portion 3a of the Bicentronics cable 3 is allowed to be housed in the housing 100, thus further reducing the area required for the apparatus. The power supply unit 14 is arranged adjacent to the connector portion 3a, and can supply predetermined electric power to the respective constituting portions.

On the other hand, the printer 4 constitutes a so-called serial printer in which a carriage 45 is reciprocally driven in the direction of an arrow A in FIG. 3 by a motor 50 along guide shafts 43 and 44, two-end portions of which are supported by base portions 41 and 42. A black ink cartridge 46, a cyan ink cartridge 47, a magenta ink cartridge 48, and a yellow ink cartridge 49, which are exchangeable, are mounted on the carriage 45 to supply inks of the respective colors to ink-jet heads.

When the carriage 45 is moved to the illustrated standby position falling outside the range of the recording sheet P, since it also falls outside the range of the scanner 7, it becomes easy to exchange the respective cartridges. Furthermore, a capping mechanism portion for attaining preliminary ink ejection of a head 33, and for covering the heads to prevent inks from drying, a cleaning mechanism portion, an ink absorbing member for absorbing an excess ink, and the like are disposed on a portion near the illustrated position of the carriage 45. Since it is easy to access this portion, it is very convenient in terms of use and manufacture.

The ink cartridges are exchangeable. For example, when monochrome recording is mainly performed, the capacity of the black ink cartridge 46 may be set to be larger than those of other cartridges. Alternatively, only the cyan ink cartridge 47, the magenta ink cartridge 48, and the yellow ink cartridge 49 may be mounted, and black may be reproduced by mixing additive primaries. Furthermore, a cartridge integrated type head unit which includes the four color ink cartridges and ink-jet heads may be exchanged. Moreover, an ink-jet head unit on which an ink tank obtained by integrating yellow, cyan, and magenta ink cartridges and a black ink tank are detachably mounted may be used. In addition, the ink cartridges and the heads may be completely separated, as described above.

A motor 51 for feeding the recording sheet P is disposed on a side opposite to the motor 50 for driving the carriage 45.

The operation panel 5 arranged at the illustrated position in FIG. 3 has respective operation portions and display portions such as a power-on portion 5f which also serves as a power-on indicator indicating the power-on state, an on-line portion 5h which is used for indicating and setting an exchange state of data with the personal computer 2, a stop portion 5a which is used for indicating and setting a forced stop state, a monochrome copy portion 5c which is used for indicating and setting a monochrome copy mode, a color copy portion 5b which is used for indicating and setting a color copy mode, an in-use display portion 5g for indicating that the apparatus is in operation, and an error display portion 5d which is used for indicating an operation error. The operation panel 5 has minimum functions required especially when the apparatus is used as a simple copying machine, i.e., a stand-alone machine.

Figure 4:
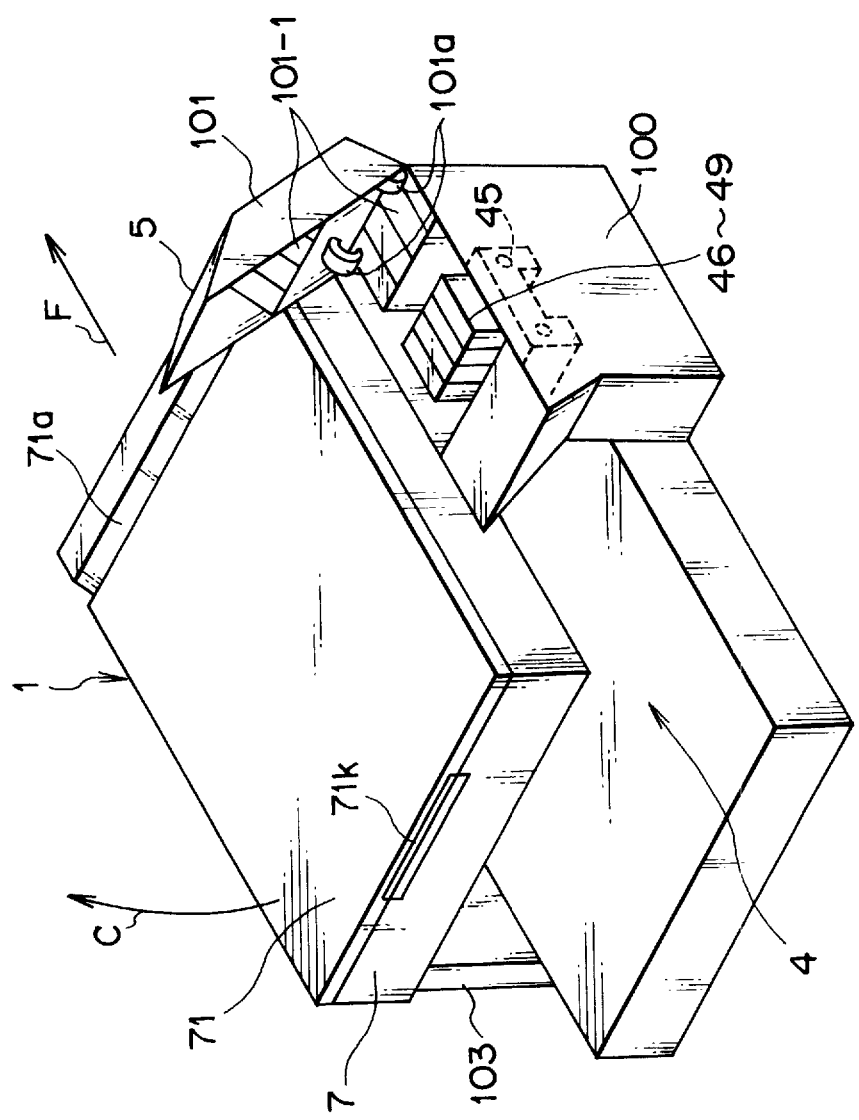
FIG. 4 is a perspective view showing the outer appearance of the apparatus 1 in a use state.

FIG. 4 is a perspective view showing the outer appearance of the apparatus 1, and shows a state wherein the respective ink cartridges 46 to 49 are exchanged. Referring to FIG. 4, a lid portion 101 integrated with the operation panel 5 is arranged on the housing 100 to be free to open in the direction of an arrow F in FIG. 5 via a pair of hinge portions 101a, and the respective ink cartridges set on the carriage 45 moved to the standby position can be arbitrarily exchanged.

On the other hand, a pressing plate 71 with a handle portion 71k is fixed on the scanner 7 to be pivotal about a hinge portion 71a in the direction of an arrow C in FIG. 4. Since this scanner 7 has no support portion on the left front side, a left side plate portion 103 which also serves as a support member is arranged, as shown in FIG. 4.

With the above-mentioned arrangement, the apparatus 1 which requires a small area, and allows an easy access to the ink cartridges 46 to 49 can be constituted.

Note that members located below the lid portion 101 are not limited to the above-mentioned ink cartridges. For example, when a serial recording type thermal head is mounted on the carriage 45, the respective color ink ribbons may be exchanged at this position. In any case, it is convenient to arrange the lid portion 101 at this position. Since the position of the lid portion 101 corresponds to a dead space which must be assured for the standby position of the carriage, it is very efficient to arrange the operation panel 5 and the lid portion 101 at this position. An ink cartridge storage portion 101-1 may be arranged inside the lid portion 101 or the housing 100 to store cartridges, so as to always stock auxiliary cartridges.

Storing the auxiliary cartridges in the lid portion or the housing is reasonable since the presence/absence of them can always be confirmed by a quite ordinary operation of opening the lid portion 101 to check the remaining amount of the ink after, e.g., an ink near empty state is informed. Since an ink tank integrated type head is packed in a dry-prevention package and does not require any cap, a simple storage portion need only be arranged.

FIG. 4 shows a state wherein the lid portion 101 is arranged on the right side of the apparatus. However, if the standby position of the carriage 45 is set on the left side of the apparatus, the lid portion 101 can be arranged on the left side, and such an arrangement is convenient for a left-handed person.

Figure 5:
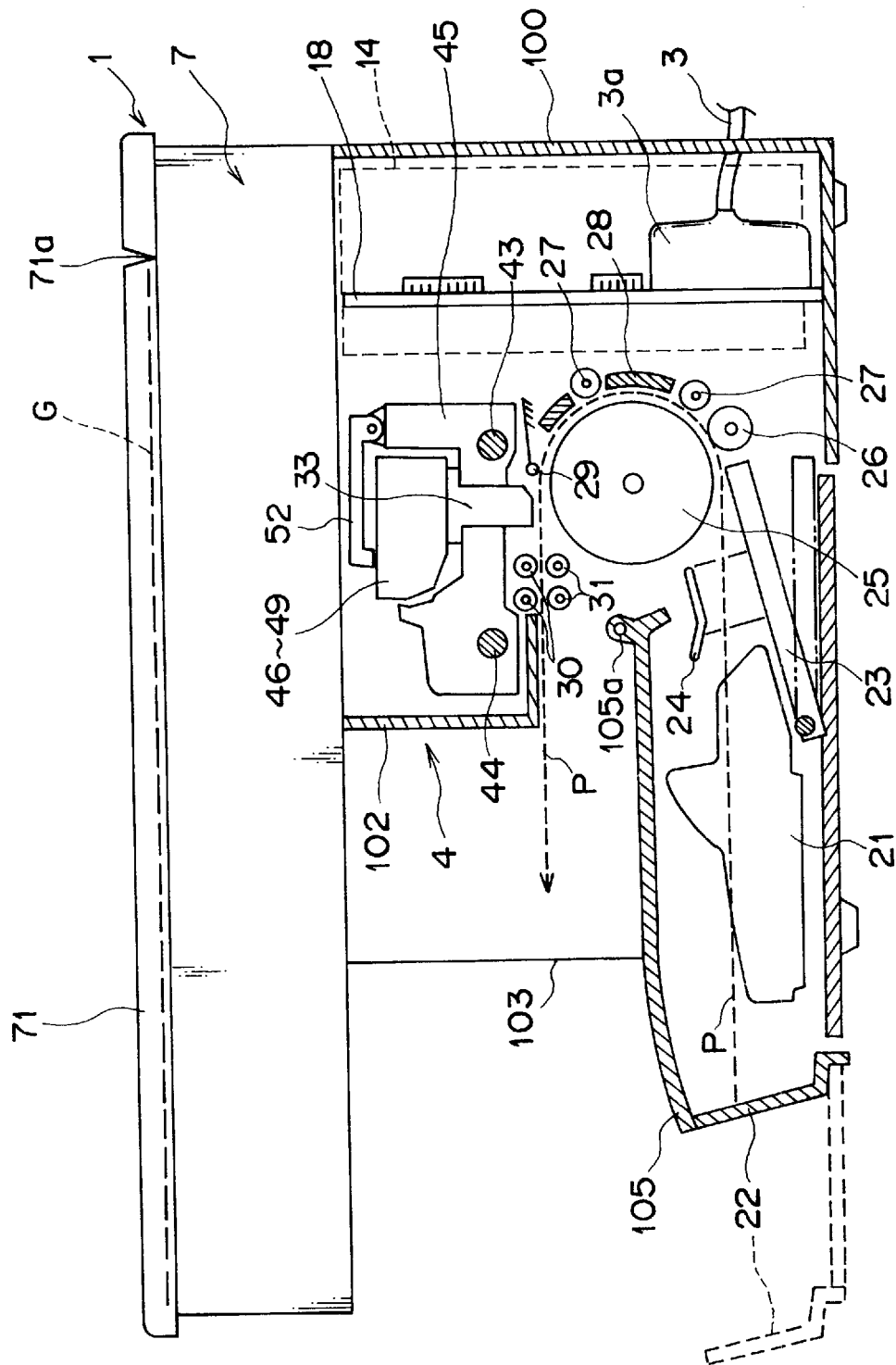
FIG. 5 is a partially sectional side view showing principal part of the apparatus 1 of the first embodiment.

FIG. 5 is a partially cutaway right sectional view showing principal part of the apparatus 1 of the first embodiment. In FIG. 5, the printer 4 has a recording sheet path, indicated by a broken line, which loads the recording sheet P indicated by a broken line in FIG. 5 from the front side and discharges it to the front side, i.e., has an arrangement for guiding the carriage 45, which is reciprocally driven in a direction perpendicular to the sheet surface with respect to the recording sheet path, along the guide shafts 43 and 44.

A stopper 52 for holding the black ink cartridge 46, the cyan ink cartridge 47, the magenta ink cartridge 48, and the yellow ink cartridge 49 at predetermined positions is arranged on the carriage 45.

On the other hand, in the recording sheet path, a sheet supply unit comprises an adjustment plate 21 which is moved stepless in the direction perpendicular to the sheet surface so as to adjust the edge portion of the recording sheet P in the widthwise direction, and an adjustment plate 22 which is moved stepless between a solid line position and a broken line position in FIG. 5 so as to adjust the end portion of the recording sheet. With respect to this sheet supply unit, the leading end portion of a recording sheet P is inserted between a regulation member 24 and a pressing plate 23 to prevent more than one sheets from being excessively fed, and the pressing plate 23 is pivoted from a broken line position to a solid line position in FIG. 5 by a driving mechanism (not shown), thereby feeding the first sheet to a position between a separation roller 26 and a platen roller 25.

Subsequently, the recording sheet P is guided to a portion below an ink-jet head 33 on the carriage 45 via a guide roller 27, a guide plate 28, and a guide pressing roller 29, and is subjected to a predetermined color recording operation. Thereafter, the recording sheet P is discharged onto a discharge tray 105 by discharge rollers 30 and spur rollers 31 which do not influence the ink surface. The board 18 and the power supply unit 14 can be arranged in the rear portion of the housing 100, as shown in FIG. 5.

Since the recording sheet P is guided along the sheet path as in the above-mentioned arrangement, the apparatus can be made compact.

Figure 6:
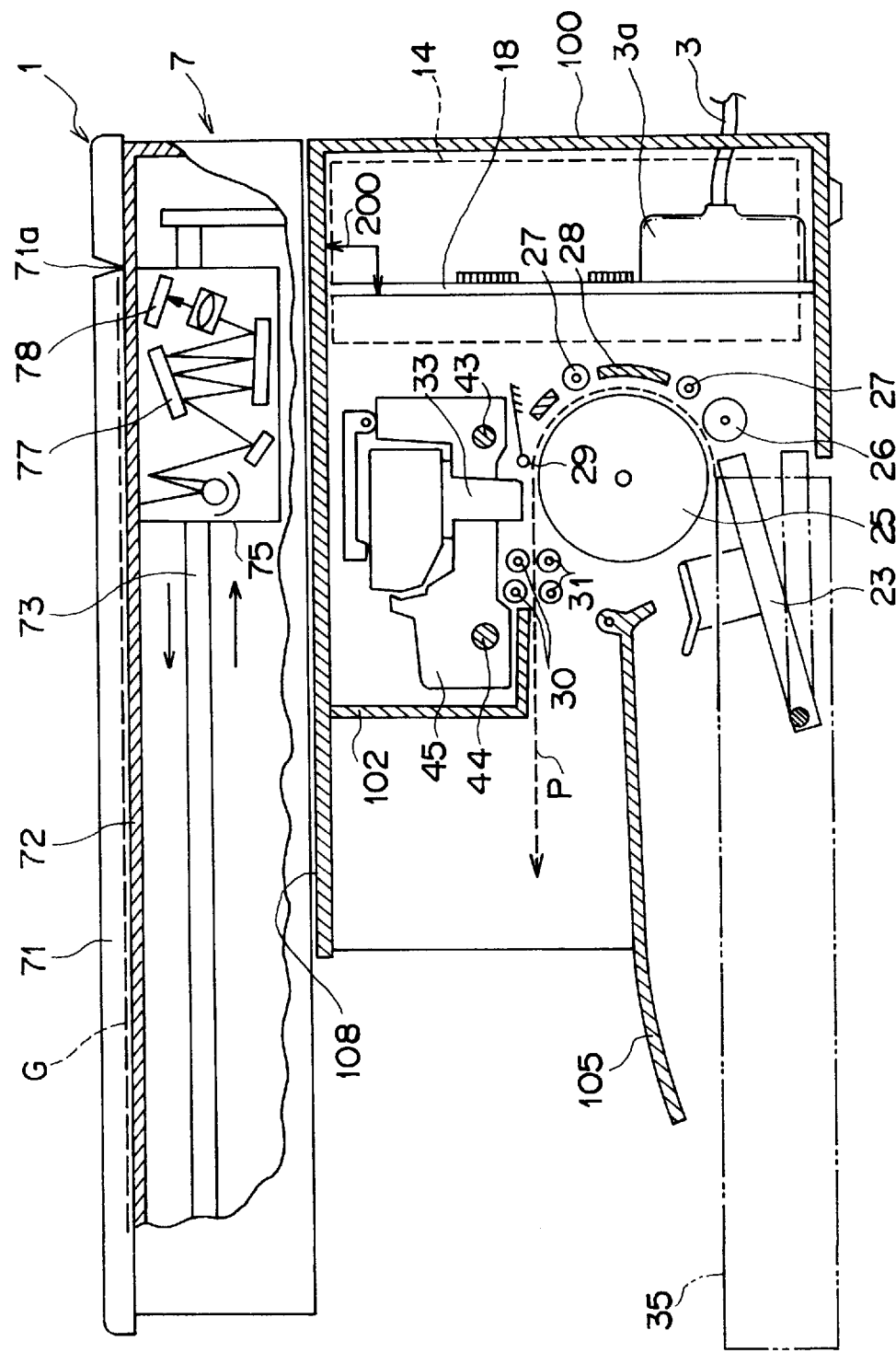
FIG. 6 is a partially sectional side view showing principal part of a modification of the apparatus shown in FIG. 5.

FIG. 6 is a partially cutaway right sectional view showing principal part of the apparatus 1 as a modification of the first embodiment. The same reference numerals in FIG. 6 denote the same parts as in FIG. 5, and only a different arrangement and a non-described portion will be explained to avoid a repetitive description. Recording sheets P are stored in a sheet cassette 35 indicated by an alternate long and two short dashed line in FIG. 6, and the sheet cassette 35 is detachable from the front side of the apparatus.

The scanner 7 is detachably arranged on a top plate 108 via a connector 200. The scanner is a flat bed type scanner which comprises, under the pressing plate 71, a light transmission plate 72 for placing a full-color or monochrome original sheet G thereon. The scanner also comprises a carriage 75 below the light transmission plate 72. The carriage 75 is driven in the longitudinal direction of the original sheet G and serves as an original reading unit for reading the image surface of the original sheet. A xenon tube 76 serving as a light source, a mirror 77, and a CCD 78 are mounted on the carriage 75, which reads an image while being moved in the direction of an arrow in FIG. 6.

Figure 7:
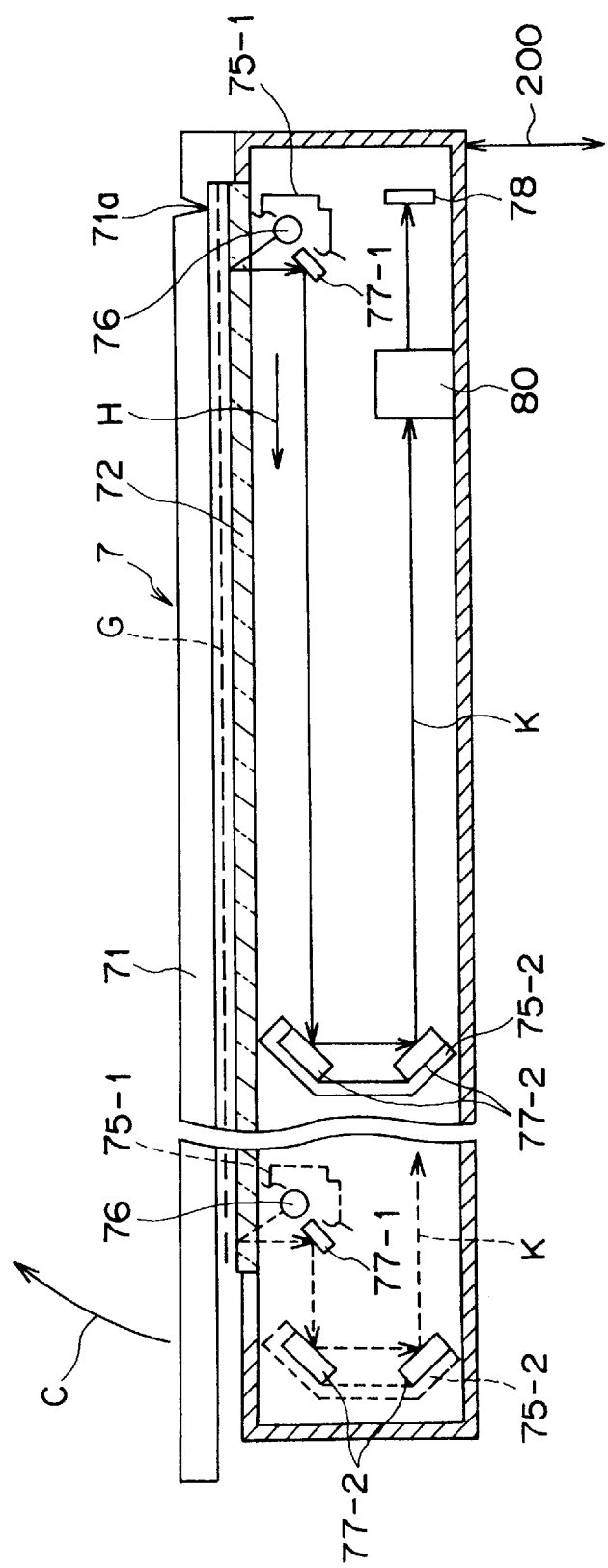
FIG. 7 is a partially sectional side view showing principal part of a scanner of the first embodiment.

FIG. 7 is a sectional view showing principal part of the fixed CCD type scanner 7. The scanner 7 is detachably arranged or fixed on the top plate 108 via the connector 200, and comprises, under the pressing plate 71, the light transmission plate 72 for placing a full-color or monochrome original sheet G thereon. The CCD 78 is fixed in position, and the xenon tube 76 serving as a light source and a mirror 77-1 are mounted on a carriage 75-1 which serves as an original reading unit for reading the image surface. Also, a mirror 77-2 is mounted on a carriage 75-2. The carriages 75-1 and 75-2 are synchronously moved by a driving mechanism (not shown) to always maintain a 1:2 movement relationship. In this case, when the carriages are moved between a broken line position and a solid line position in FIG. 7, the length of an optical path K is kept constant.

Figure 8:
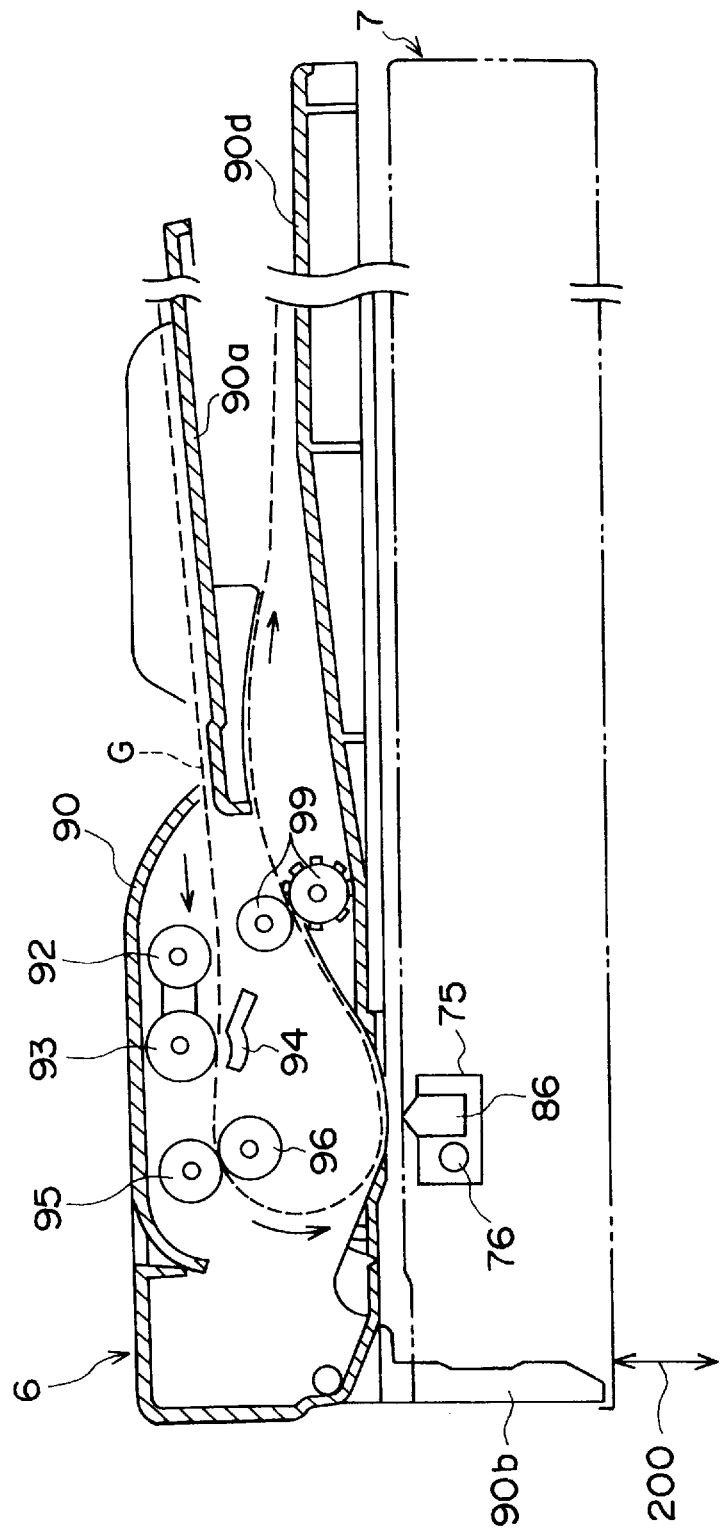
FIG. 8 is a partially sectional side view showing principal part of an automatic original feeder 6.

FIG. 8 is a sectional view showing principal part of the scanner 7 which uses a contact type line sensor. FIG. 8 shows the scanner 7 together with the automatic sheet feed unit 6. In FIG. 8, the unit 6 is detachable via the connector 200, and is set at the illustrated position by setting a hook portion 90b after the pressing plate 71 is detached.

On the other hand, the xenon tube 76 serving as a light source and a contact type line image sensor 86 are mounted on the carriage 75 serving as an original reading unit for reading the image surface, and is fixed at the illustrated position by a driving mechanism (not shown).

After the above-mentioned setting operation, a plurality of original sheets G are placed on a tray 90a, and are conveyed by a pickup roller 92 in the direction of an arrow in FIG. 8. Then, the first original sheet is separated between a friction piece 94 and a separation roller 93, and is fed into a portion between rollers 95 and 96. Then, the original sheet is guided by a guide (not shown), as shown in FIG. 8, and is fed onto the contact type line image sensor 86. At this position, the original sheet is subjected to an original reading operation, and is then fed onto a discharge tray 90d by discharge rollers 99.

Figure 9:
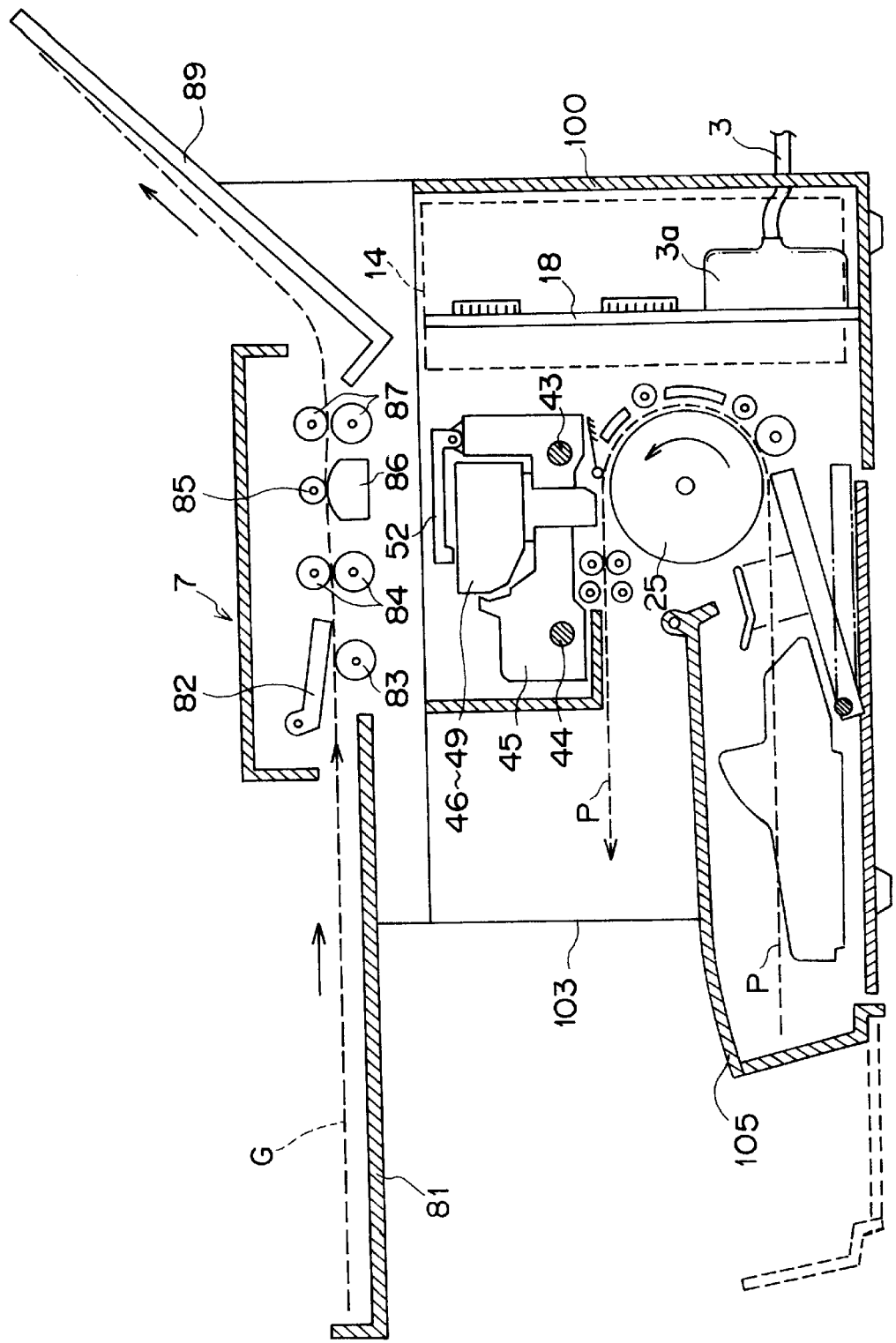
FIG. 9 is a partially sectional side view showing principal part of an apparatus 1 of the second embodiment.

FIG. 9 is a sectional view of an apparatus according to the second embodiment. The same reference numerals in FIG. 9 denote the same parts as in the first embodiment, and only a different arrangement and a non-described portion will be explained to avoid a repetitive description. The scanner 7 comprises an original sheet path which loads a full-color or monochrome original sheet G from the front side and discharges it onto a discharge tray 89 on the rear side, and an original reading unit which is fixed so that its longitudinal direction extends in a direction perpendicular to the original sheet path. For this reason, original sheets G are placed on a tray 81 with their image surfaces facing down. The first original sheet is separated by a separation roller 83 and a pressing plate 82, and is fed into a portion between rollers 84 and 85. Thereafter, the original sheet is fed into a portion between a platen roller 85 and a proximity line image sensor 86, and is subjected to an original reading operation. Then, the original sheet is fed onto the discharge tray 89 by discharge rollers 87.

With this arrangement, an image processing apparatus, which can minimize the area required for the scanner 7 and the printer 4, and can take effective countermeasure against noise, can be provided.

Figure 10:
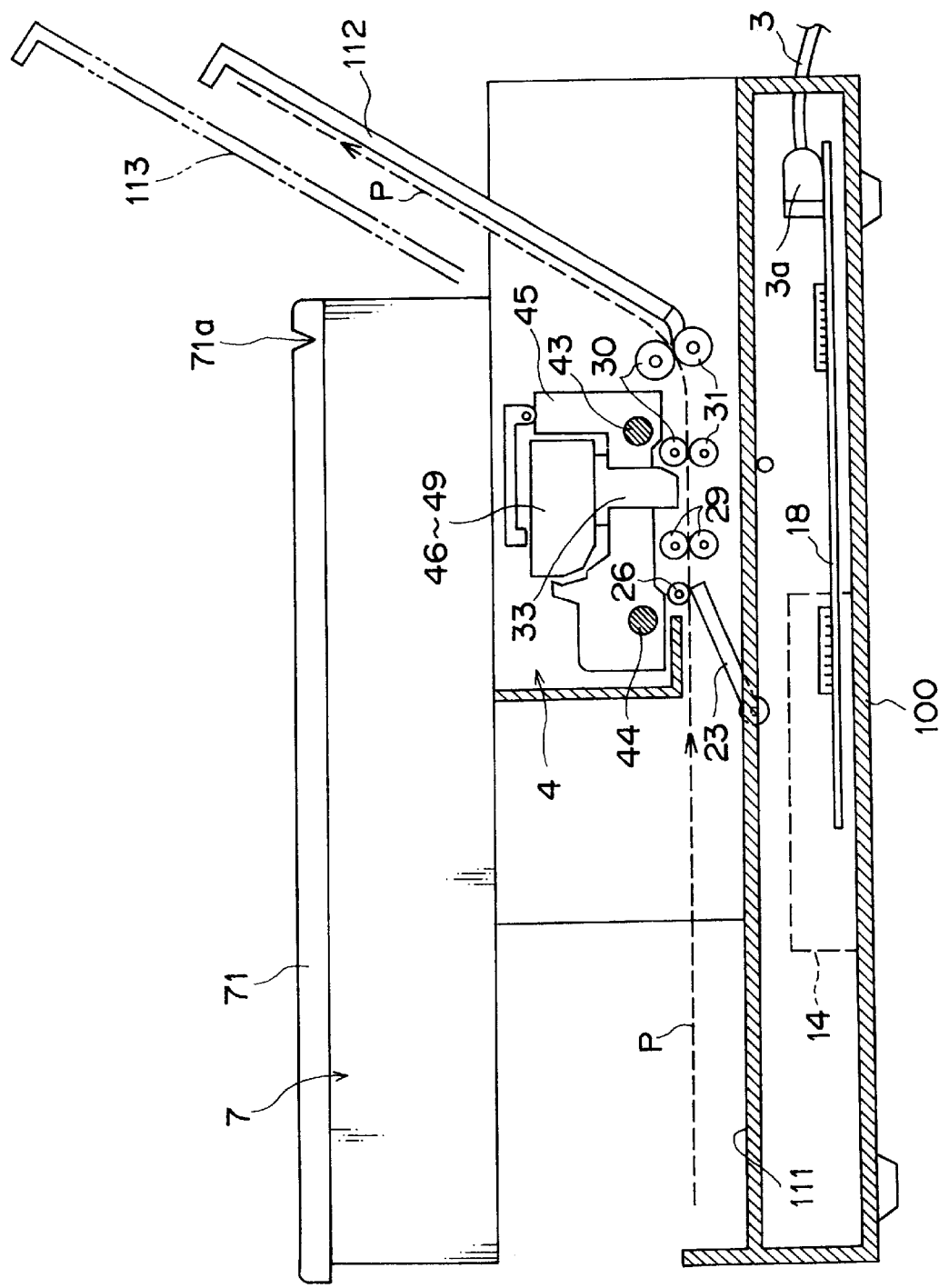
FIG. 10 is a partially sectional side view showing principal part of an apparatus 1 of the third embodiment.

FIG. 10 is a sectional view of an apparatus according to the third embodiment. The same reference numerals in FIG. 10 denote the same parts as in the first embodiment, and only a different arrangement and a non-described portion will be explained to avoid a repetitive description. The printer 4 is a serial printer comprising a recording sheet path which loads a recording sheet P from a tray 111 on the front side, and discharges it onto a discharge tray 112 on the rear side, and an ink-jet head 33 which is reciprocally driven in a direction substantially perpendicular to the recording sheet path. For this reason, a separation roller 26 and a separation plate 23 are located at the entrance portion of the tray 112. The first recording sheet is separated by the separation roller 26 and the separation plate 23, and is fed into a portion between rollers 29. Thereafter, the recording sheet is subjected to a predetermined color recording operation by the ink-jet head 33, and is then discharged onto the discharge tray 111 by discharge rollers 30 and spur rollers 31 which do not influence the ink surface.

Since the board 18 and the power supply unit 14 can be disposed on the bottom surface portion of the housing 100, as shown in FIG. 10, the apparatus can be made compact.

Figure 11:
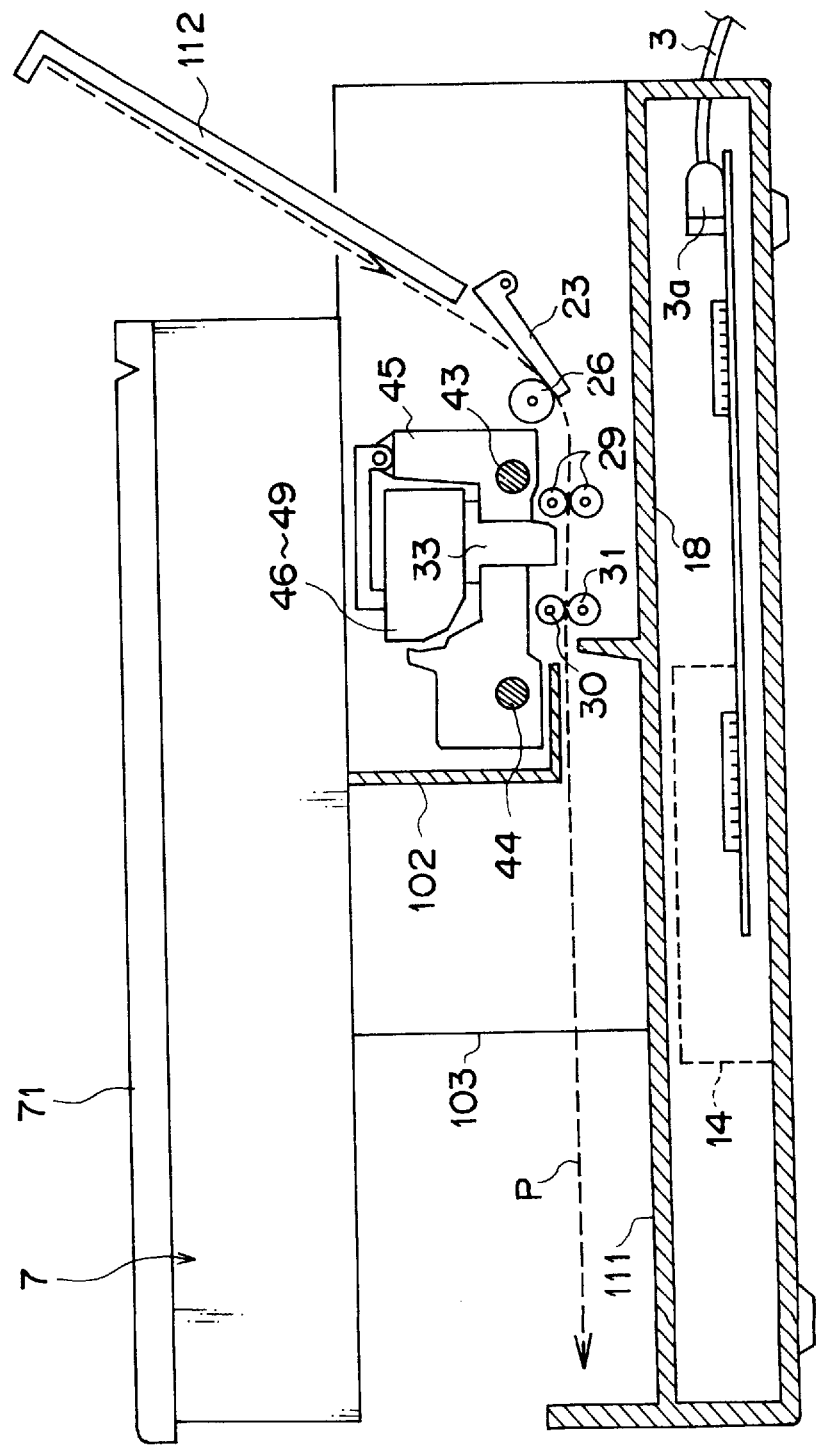
FIG. 11 is a partially sectional side view showing principal part of an apparatus 1 of the fourth embodiment.

Finally, FIG. 11 is a sectional view of an apparatus according to the fourth embodiment. The same reference numerals in FIG. 11 denote the same parts as in the first embodiment, and only a different arrangement and a non-described portion will be explained to avoid a repetitive description. The printer 4 is a serial printer comprising a recording sheet path which loads a recording sheet P from the tray 112 on the rear side, and discharges it onto the discharge tray 111 on the front side, and the ink-jet head 33 which is reciprocally driven in a direction substantially perpendicular to the recording sheet path.

With this arrangement, the separation roller 26 and the separation plate 23 are located at the entrance portion of the tray 112. The first recording sheet is separated by the separation roller 26 and the separation plate 23, and is fed into a portion between the rollers 29. Thereafter, the recording sheet is subjected to a predetermined color recording operation by the ink-jet head 33, and is then discharged onto the discharge tray 111 by the discharge rollers 30 and the spur rollers 31 which do not influence the ink surface. Since the board 18 and the power supply unit 14 can be disposed on the bottom surface portion of the housing 100, as shown in FIG. 11, the apparatus can be made compact.

With the above-mentioned arrangement, an image processing apparatus which can minimize the area required for the scanner 7 and the printer 4, and can take effective countermeasure against noise can be provided. Note that the present invention may be appropriately applied to a single system or a plurality of systems.

As described above, according to the present invention, an image processing apparatus, which uses a Bicentronics-standard interface cable to prevent cables from being complicated, can minimize the area required for the scanner and printer, can take effective countermeasure against noise, and can obtain a desired hard copy by setting original and recording sheets to have an accurate relative positional relationship therebetween, can be provided.

Also, an image processing apparatus, which uses a Bicentronics-standard interface cable to prevent cables from being complicated, can minimize the area required for the scanner and printer, can take effective countermeasure against noise, allows a user to handle original and recording sheets from the front side with good operability, and can obtain a desired hard copy by setting original and recording sheets to have an accurate relative positional relationship therebetween, can be provided.

Furthermore, an image processing apparatus, which can constitute a simple copying machine that can minimize the area required for the scanner and printer, has good operability, and can obtain a desired hard copy by setting original and recording sheets to have an accurate relative positional relationship therebetween, can be provided.

Moreover, an image processing apparatus, which uses a Bicentronics-standard interface cable to prevent cables from being complicated, can minimize the area required for the scanner and printer, can take effective countermeasure against noise, and can obtain a desired hard copy by setting original and recording sheets to have an accurate relative positional relationship therebetween, can be provided.

Also, an image processing apparatus, which can constitute a simple copying machine that can minimize the area required for the scanner and printer, has good operability, and can obtain a desired hard copy by setting original and recording sheets to have an accurate relative positional relationship therebetween, can be provided.

In addition, an image processing apparatus, which uses a Bicentronics-standard interface cable to prevent cables from being complicated, can minimize the area required for the scanner and printer, can take effective countermeasure against noise, can restart a recording operation any time by storing auxiliary recording media in the apparatus, and can obtain a desired hard copy, can be provided.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus, which integrates a recording device which has a recording sheet supply unit with a sheet size adjustment function that allows recording sheets of different sizes to be placed so as to obtain a hard copy, and an image reading device which has an original reading unit for reading an image surface of an original sheet after aligning a leading end portion of the original sheet so as to read original sheets of different sizes, comprising:

a housing which houses a first control circuit unit for said recording device and a second control circuit unit for said image reading device, a storage unit for temporarily storing an image processed between said apparatus and a host computer and an image to be output to said recording device, and a power supply unit, and has a structure for disposing said image reading device above said recording device; and an interface cable connected to said storage unit and the host computer, thereby permitting bidirectional data exchange between said storage unit and the host computer.

2. An image processing apparatus, which integrates a recording device which allows a user to handle a recording sheet from a front side and has a recording sheet supply unit with a sheet size adjustment function that allows recording sheets of different sizes to be placed so as to obtain a hard copy, and an image reading device which allows the user to handle an original sheet from a front side to read a desired image, and has an original reading unit for reading an image surface of an original sheet after aligning a leading end portion of the original sheet so as to read original sheets of different sizes, comprising:

a housing which houses a first control circuit unit for said recording device and a second control circuit unit for said image reading device, a storage unit for temporarily storing an image processed between said apparatus and a host computer and an image to be output to said recording device, and a power supply unit, and has a structure for disposing said image reading device above said recording device; and an interface cable connected to said storage unit and the host computer, thereby permitting bidirectional data exchange between said storage unit and the host computer.

3. An image processing apparatus, which integrates a recording device which allows a user to handle a recording sheet from a front side and has a recording sheet supply unit with a sheet size adjustment function that allows recording sheets of different sizes to be placed so as to obtain a hard copy, and an image reading device which allows the user to handle an original sheet from a front side to read a desired image, and has an original reading unit for reading an image surface of an original sheet after aligning a leading end portion of the original sheet so as to read original sheets of different sizes, comprising:

a housing which houses a first control circuit unit for said recording device and a second control circuit unit for said image reading device, a storage unit for temporarily storing an image to be output to said recording device, and a power supply unit, and has a structure for disposing said image reading device near said recording device;

an interface cable connected to said storage unit and said recording device, thereby permitting bidirectional data exchange between said storage unit and the host computer; and an operation unit for performing a copying operation, wherein said recording device is a serial printer which comprises a recording sheet path which loads the recording sheet from the front side and discharges the recording sheet to the front side, and a recording unit which is reciprocally driven in a direction substantially perpendicular to the recording sheet path.

4. The apparatus according to any one of claims 1 to 3, wherein said recording device is a serial printer comprising a recording sheet path which loads the recording sheet from a rear side and discharges the recording sheet to the front side, and a recording unit which is reciprocally driven in a direction substantially perpendicular to the recording sheet path.

5. The apparatus according to any one of claims 1 to 3, wherein said recording device comprises an ink-jet head for ejecting color inks of at least three primary colors onto the recording sheet, and said recording device is constituted as a full-color printer.

6. The apparatus according to any one of claims 1 to 3, wherein said recording device comprises an ink-jet head for ejecting black ink onto the recording sheet, and said recording device is constituted as a monochrome printer.

7. The apparatus according to any one of claims 1 to 3, wherein said recording device comprises an ink-jet head for ejecting black ink and three primary color inks onto the recording sheet, and said recording device can be arbitrarily set as a one of a full-color printer and a monochrome printer.

8. The apparatus according to any one of claims 1 to 3, wherein said recording device comprises a thermal line head which is disposed so that a longitudinal direction thereof extends in a direction substantially perpendicular to said recording sheet path, and said recording device is constituted as a monochrome thermal printer.

9. The apparatus according to any one of claims 1 to 3, wherein said recording device comprises an automatic sheet feed unit for supplying each of a plurality of recording sheets placed on said recording sheet supply unit toward said recording unit.

10. The apparatus according to claim 11, wherein said automatic sheet feed unit comprises a recording sheet cassette which loads a plurality of recording sheets and is attached/detached from the front side to/from the apparatus.

11. The apparatus according to any one of claims 1 to 3, wherein said image reading device comprises an original placing unit having a light transmission plate for placing a full-color or monochrome original sheet thereon, and an original reading unit which is driven in a longitudinal direction of the original sheet in a portion under said original placing unit, and reads an image surface of the original sheet.

12. The apparatus according to claim 11, wherein said image reading device comprises a pressing plate which is supported on a rear-side portion of said original placing unit so that a front portion thereof is free to open, and a reference mark which is arranged on a right rear-side portion viewed from the front side, and is used for aligning the original sheet, and the leading end portion of the original sheet is matched with the reference mark.

13. The apparatus according to any one of claims 1 to 3, wherein said image reading device comprises an original sheet path which loads a full-color or monochrome original sheet from the front side and discharges the original sheet to a rear side, and an original reading unit which is fixed so that a longitudinal direction thereof extends in a direction substantially perpendicular to said original sheet path.

14. The apparatus according to any one of claims 1 to 3, wherein said image reading device comprises an original sheet path which loads a full-color or monochrome original sheet from a rear side and discharges the original sheet to the front side, and an original reading unit which is fixed so that a longitudinal direction thereof extends in a direction substantially perpendicular to said original sheet path.

15. The apparatus according to claim 13, wherein said original reading device comprises a line image sensor unit which comprises an equal-magnification contact type or reduction optical system having a reading width corresponding to at least the image surface of the original sheet.

16. The apparatus according to claim 15, wherein said line image sensor of said original reading unit is fixed like a CCD element, and has a reduction optical system in which a light source and an optical lens system are integrally formed.

17. The apparatus according to any one of claims 1 to 3, wherein said image reading device comprises an original sheet supply unit with an original sheet size adjustment function that allows original sheets of different sizes to be placed, and an automatic original sheet feed unit for supplying each of a plurality of original sheets placed on said original sheet supply unit toward said reading unit.

18. The apparatus according to claim 17, wherein said automatic original sheet feed unit is detachably arranged on an original placing unit.

19. An image processing apparatus, which integrates a recording device which allows a user to handle a recording sheet from a front side and has a recording sheet supply unit, and an image reading device which allows the user to handle an original sheet from a front side to read a desired image, and has an original reading unit for reading an image surface of an original sheet after aligning a leading end portion of the original sheet so as to read original sheets, comprising:

a housing which houses a first control circuit unit for said recording device and a second control circuit unit for said image reading device, a storage unit for temporarily storing an image to be output to said recording device, and a power supply unit, and has a structure for disposing said image reading device near said recording device;

an interface cable connected to said storage unit and said recording device; and an operation unit for performing a copying operation, wherein said recording device is a serial printer comprising a recording sheet path which loads the recording sheet from the front side and discharges the recording sheet to a rear side, and a recording unit which is reciprocally driven in a direction substantially perpendicular to the recording sheet path.

20. An image processing apparatus which integrates a recording device for obtaining a hard copy, and an image reading device for reading a desired image, comprising:

a housing which houses a first control circuit unit for said recording device and a second control circuit unit for said image reading device, a storage unit for temporarily storing an image processed between said apparatus and a host computer and an image to be output to said recording device, and a power supply unit, disposes said image reading device above said recording device, and has an operation panel unit disposed adjacent to a side surface portion of said image reading device; and an interface cable connected to said storage unit and the host computer, thereby permitting bidirectional data exchange between said storage unit and the host computer.

21. The apparatus according to claim 20, wherein said recording device is a serial printer comprising a recording sheet path which loads the recording sheet from the front side and discharges the recording sheet to the front side, and a recording unit which is reciprocally driven in a direction substantially perpendicular to the recording sheet path, and a lid portion used for exchanging a recording medium used in said recording unit is arranged above a standby position of said recording unit.

22. The apparatus according to claim 21, wherein said recording unit comprises an ink-jet head for ejecting color inks of at least three primary colors onto the recording sheet to constitute said recording device as a full-color printer, and the recording medium is stored in an exchangeable ink cartridge.

23. The apparatus according to claim 20, wherein said recording device is a serial printer comprising a recording sheet path which loads the recording sheet from the front side and discharges the recording sheet to the front side, and a recording unit which is reciprocally driven in a direction substantially perpendicular to the recording sheet path, and a lid portion which is free to open with respect to said housing so as to exchange a recording medium used in said recording unit, and which is integrally formed with said operation panel unit is arranged a standby position of said recording unit.

24. The apparatus according to claim 20, wherein the recording sheet is allowed to be handled from the front side to obtain a hard copy by said recording device, and the original sheet is allowed to be handled from the front side to read a desired image by said image reading device.

25. The apparatus according to claim 20, wherein said image reading device comprises a pressing plate which is supported on a rear-side portion of an original placing unit of said original reading device so that a front portion thereof is free to open, and a reference mark which is arranged on a right rear-side portion viewed from the front side, and is used for aligning the original sheet.

26. An image processing apparatus comprising:

a housing for defining an outer appearance of said image processing apparatus;

a recording device which has a recording unit and a recording sheet feed path for feeding a recording sheet to said recording unit, and is arranged in a lower portion of said housing;

a reading device which has a reading unit and an original sheet placing table for reading an original sheet by said reading unit, is coupled to said recording unit at rear portions thereof, and is arranged in an upper portion of said housing so that said housing has a two-tiered structure;

an operation unit which is arranged on a side portion of said housing to couple said reading device and said recording device; and a control circuit board which mounts a first control circuit unit for said recording device and a second control circuit unit for said reading device, is connected to an external host computer via an interface cable, and is arranged in a rear portion of said housing.

27. An image processing apparatus comprising:

a recording device;

a reading device arranged above said recording device;

a housing which couples said recording device and said reading device at rear portions thereof to form a two-tiered structure, and defines an outer appearance of said image processing apparatus;

an operation unit which couples said reading device and said recording device, and is arranged on a side portion of said housing; and a control circuit board which mounts a first control circuit unit for said recording device and a second control circuit unit for said reading device, is connected to an external device via an interface cable, and is arranged in a rear portion of said housing.

28. An image processing apparatus comprising:

a housing for defining an outer appearance of said image processing apparatus;

a recording device which has a recording sheet supply unit with a sheet size adjustment function that allows recording sheets of different sizes to be placed so as to obtain a hard copy, and is arranged in a lower portion of said housing;

an image reading device which is coupled to said recording device at rear portions thereof to form said housing in a two-tiered structure, has an original reading unit for reading an image surface of an original sheet after aligning a leading end portion of the original sheet so as to read original sheets of different sizes, and is arranged in said housing above said recording unit;

an operation unit which is arranged on a side portion of said housing to couple said reading device and said recording device; and a control circuit board which mounts a first control circuit unit for said recording device and a second control circuit unit for said reading device, is connected to an external device, via an interface cable, and is arranged in a rear portion of said housing.

29. The apparatus according to claims 27 or 28, wherein said recording device is a serial printer which comprises a recording sheet path which loads the recording sheet from the front side and discharges the recording sheet to the front side, and a recording unit which is reciprocally driven in a direction substantially perpendicular to the recording sheet path.

30. The apparatus according to claims 27 or 28, wherein said recording device is a serial printer comprising a recording sheet path which loads the recording sheet from the front side and discharges the recording sheet to a rear side, and a recording unit which is reciprocally driven in a direction substantially perpendicular to the recording sheet path.

31. The apparatus according to claims 27 or 28, wherein said recording device is a serial printer comprising a recording sheet path which loads the recording sheet from a rear side and discharges the recording sheet to the front side, and a recording unit which is reciprocally driven in a direction substantially perpendicular to the recording sheet path.

32. The apparatus according to claims 27 or 28, wherein said recording device comprises an ink-jet head for ejecting color inks of at least three primary colors onto the recording sheet, and said recording device is constituted as a full-color printer.

33. The apparatus according to claims 27 or 28, wherein said recording device comprises an ink-jet head for ejecting black ink onto the recording sheet, and said recording device is constituted as a monochrome printer.

34. The apparatus according to claims 27 or 28, wherein said recording device comprises an ink-jet head for ejecting black ink and three primary color inks onto the recording sheet, and said recording device can be arbitrarily set as a one of a full-color printer and a monochrome printer.

35. The apparatus according to claims 27 or 28, wherein said recording device comprises a thermal line head which is disposed so that a longitudinal direction thereof extends in a direction substantially perpendicular to said recording sheet path, and said recording device is constituted as a monochrome thermal printer.

36. The apparatus according to claims 27 or 28, wherein said recording device comprises an automatic sheet feed unit for supplying each of a plurality of recording sheets placed on said recording sheet supply unit toward said recording unit.

37. The apparatus according to claim 36, wherein said automatic sheet feed unit comprises a recording sheet cassette which loads a plurality of recording sheets and is attached/detached from the front side to/from the apparatus.

38. The apparatus according to claims 27 or 28, wherein said reading device comprises an original placing unit having a light transmission plate for placing a full-color or monochrome original sheet thereon, and an original reading unit which is driven in a longitudinal direction of the original sheet in a portion under said original placing unit, and reads an image surface of the original sheet.

39. The apparatus according to claim 38, wherein said reading device comprises a pressing plate which is supported on a rear-side portion of said original placing unit so that a front portion thereof is free to open, and a reference mark which is arranged on a right rear-side portion viewed from the front side, and is used for aligning the original sheet, and the leading end portion of the original sheet is matched with the reference mark.

40. The apparatus according to claims 27 or 28, wherein said reading device comprises an original sheet path which loads a full-color or monochrome original sheet from the front side and discharges the original sheet to a rear side, and an original reading unit which is fixed so that a longitudinal direction thereof extends in a direction substantially perpendicular to said original sheet path.

41. The apparatus according to claims 27 or 28, wherein said reading device comprises an original sheet path which loads a full-color or monochrome original sheet from a rear side and discharges the original sheet to the front side, and an original reading unit which is fixed so that a longitudinal direction thereof extends in a direction substantially perpendicular to said original sheet path.

42. The apparatus according to claims 27 or 28, wherein said original reading device comprises a line image sensor unit which comprises an equal-magnification contact type or reduction optical system having a reading width corresponding to at least the image surface of the original sheet.

43. The apparatus according to claim 42, wherein said line image sensor of said original reading unit is fixed like a CCD element, and has a reduction optical system in which a light source and an optical lens system are integrally formed.

44. The apparatus according to claims 27 or 28, wherein said reading device comprises an original sheet supply unit with an original sheet size adjustment function that allows original sheets of different sizes to be placed, and an automatic original sheet feed unit for supplying each of a plurality of original sheets placed on said original sheet supply unit toward said reading unit.

45. The apparatus according to claim 44, wherein said automatic original sheet feed unit is detachably arranged on an original placing unit.

46. An image processing apparatus which integrates a recording device using an exchangeable recording medium to obtain a hard copy, and an image reading device for reading a desired image, comprising:

a housing which houses a first control circuit unit for said recording device and a second control circuit unit for said image reading device, a storage unit for temporarily storing an image processed between said apparatus and a host computer and an image to be output to said recording device, and a power supply unit, disposes said image reading device above said recording device, and has a lid portion disposed adjacent to a side surface portion of said image reading device, and a recording medium storage portion from which the recording medium is detachable in an open state of said lid portion; and an interface cable connected to said storage unit and the host computer, thereby permitting bidirectional data exchange between said storage unit and the host computer.

47. The apparatus according to claim 46, wherein said recording device is a serial printer comprising a recording sheet path which loads the recording sheet from the front side and discharges the recording sheet to a rear side, and a recording unit which is reciprocally driven in a direction substantially perpendicular to the recording sheet path, and said lid portion is arranged above a standby position of said recording unit so as to be open to the front side of said housing.

48. The apparatus according to claim 47, wherein said recording unit comprises an ink-jet head for ejecting color inks of at least three primary colors onto the recording sheet to constitute said recording device as a full-color printer, and the recording medium is stored in an exchangeable cartridge.

49. The apparatus according to claim 47, wherein said recording unit is constituted by integrating an ink-jet head for ejecting color inks of at least three primary colors onto the recording sheet and an ink cartridge which stores the color inks of the three primary colors, and is packed in an ink dry-prevention package.

50. The apparatus according to claim 46, wherein said recording device is a serial printer comprising a recording sheet path which loads the recording sheet from the front side and discharges the recording sheet to the front side, and a recording unit which is reciprocally driven in a direction substantially perpendicular to the recording sheet path, and said lid portion is arranged to be free to open with respect to said housing and is formed integrally with an operation panel above a standby position of said recording unit so as to facilitate an exchange operation of the recording medium.

\* \* \* \* \*

UNITED STATES PATENT AND TRADEMARK OFFICE
CERTIFICATE OF CORRECTION

PATENT NO. : 5,844,687
DATED : December 1, 1998
INVENTOR(S) : Hiromichi Nagane, et al.

It is certified that error appears in the above-identified patent and that said Letters Patent is hereby corrected as shown below:

<u>COLUMN 2</u>

Line 3, "set" should read --be set--.

<u>COLUMN 11</u>

Line 11, "one sheets" should read --one sheet--.

<u>COLUMN 15</u>

Line 48, "claim 11" should read --claim 9--.

<u>COLUMN 17</u>

Line 32, "unit is" should read --unit, is--; and
Line 44, "viewed" should read --is viewed--.

Signed and Sealed this

Third Day of August, 1999

Attest:

Attesting Officer

Q. TODD DICKINSON

Acting Commissioner of Patents and Trademarks